US008834822B1

(12) United States Patent  (10) Patent No.: US 8,834,822 B1
Gay et al.  (45) Date of Patent: Sep. 16, 2014

(54) REGENERABLE IMMOBILIZED AMINOSILANE SORBENTS FOR CARBON DIOXIDE CAPTURE APPLICATIONS

(75) Inventors: McMahan Gay, Pittsburgh, PA (US); Sunho Choi, Chestnut Hill, MA (US); Christopher W. Jones, Mableton, GA (US)

(73) Assignees: Georgia Tech Research Corporation, Atlanta, GA (US); U.S. Department of Energy, Washington, DC (US)

( * ) Notice: Subject to any disclaimer, the term of this patent is extended or adjusted under 35 U.S.C. 154(b) by 600 days.

(21) Appl. No.: 13/212,284

(22) Filed: Aug. 18, 2011

Related U.S. Application Data

(60) Provisional application No. 61/374,747, filed on Aug. 18, 2010.

(51) Int. Cl.
| | |
|---|---|
| *B01D 53/62* | (2006.01) |
| *B01D 53/74* | (2006.01) |
| *B01D 53/96* | (2006.01) |
| *B01J 20/26* | (2006.01) |
| *B01J 20/30* | (2006.01) |
| *B01J 20/32* | (2006.01) |
| *B01J 20/34* | (2006.01) |

(52) U.S. Cl.
USPC ........... 423/228; 432/230; 502/400; 502/401; 502/402; 502/407

(58) Field of Classification Search
None
See application file for complete search history.

(56) References Cited

U.S. PATENT DOCUMENTS

| | | | |
|---|---|---|---|
| 6,547,854 B1 | 4/2003 | Gray et al. | |
| 7,288,136 B1 | 10/2007 | Gray et al. | |
| 8,138,117 B2 * | 3/2012 | Fryxell et al. | 502/402 |

OTHER PUBLICATIONS

Wen Li, et al., Steam-Stripping for Regeneration of Supported Amine-Based CO2 Absorbents, Chem. Sus. Chem., 2010, 3, p. 899-903, Wiley-Verlag GmbH & Co., KGaA Weinheim.
M.L. Gray, et al., Performance of Immobilized Tertiary Amine Solid Sorbents for the Capture of Carbon Dioxide, International Journal of Greenhosue Gas Control, vol. 2 #1, Jan. 2008, p. 1-8.
Sinho Choi, et al., Molecular Design and Mechanistic Understanding of Amine-Functionalized CO2 Absorbents, Monthly Report NETL/GT, Jul. 10, 2011, School of Chemical and Biomolecular Engineering, Georgia Institute of Technology, Atlanta, Georgia, 8 pages.
A.D. Ebner, et al., Suitability of a Solid Amine Sorbent for CO2 Capture by Pressure Swing Absorption, 2011 American Chemical Socity, Ind. Eng. Chem Res. 2011, 50, pp. 5634-5641.

(Continued)

*Primary Examiner* — Stanley Silverman
*Assistant Examiner* — Daniel Berns
(74) *Attorney, Agent, or Firm* — Troutman Sanders LLP; Ryan A. Schneider

(57) ABSTRACT

A method for the separation of carbon dioxide from ambient air and flue gases is provided wherein a phase separating moiety with a second moiety are simultaneously coupled and bonded onto an inert substrate to create a mixture which is subsequently contacted with flue gases or ambient air. The phase-separating moiety is an amine whereas the second moiety is an aminosilane, or a Group 4 propoxide such as titanium (IV) propoxide (tetrapropyl orthotitanate, $C_{12}H_{28}O_4Ti$). The second moiety makes the phase-separating moiety insoluble in the pores of the inert substrate. The new sorbents have a high carbon dioxide loading capacity and considerable stability over hundreds of cycles. The synthesis method is readily scalable for commercial and industrial production.

11 Claims, 7 Drawing Sheets

FT-IR spectra of PEI/silica (bottom), T-PEI/silica (middle), and A-PEI/silica (top) materials.

(56) References Cited

OTHER PUBLICATIONS

Sunho Cho, et al., Amine-Tethered Solid Absorbents Coupling High Absorption Capacity and Regenerability for CO2 Capture from Ambient Air, 2011 Wiley-VCH Verlag GmbH & Co., KGaA, Weinheim, ChemSusChem 2011, 4, pp. 628-635.

M.L. Gray, et al., Parametric Study of Solid Amine Sorbents for Capture of Carbon Dioxide, Energy Fuels, 2009, 22, pp. 4840-4844.

* cited by examiner

Aminosilane and polyethyleneimine interaction resulting in hydrogen bonds, silane coupling and cross-linkage for the promotion of the formation of a hydrophobic film.

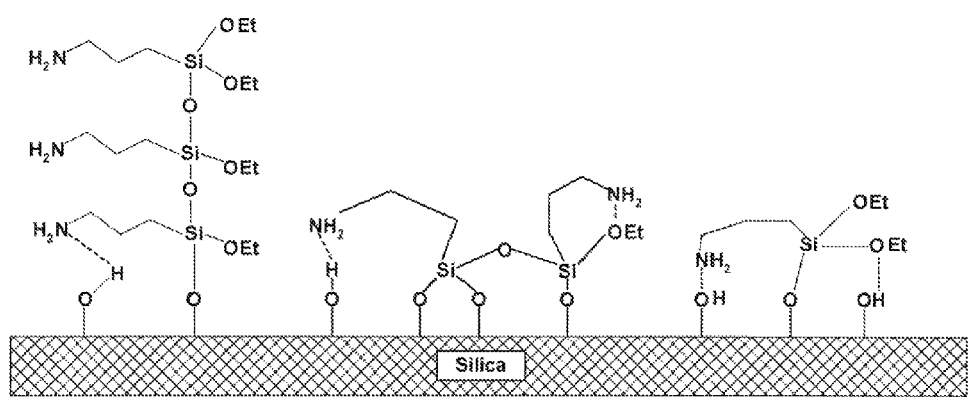
FIG. 2  Aminosilane interactions with the silica surface and itself for the formation of covalent bonds, hydrogen bonds and cross-linkage.

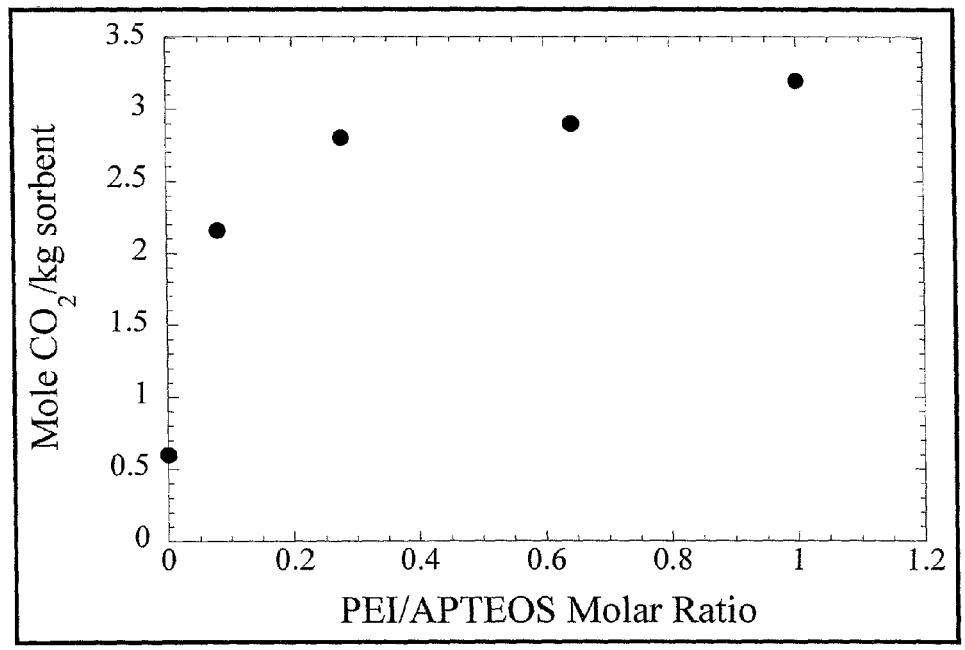
FIG. 3. $CO_2$ Capacities of PEI/APTEOS Sorbents at Various Molar Ratios.

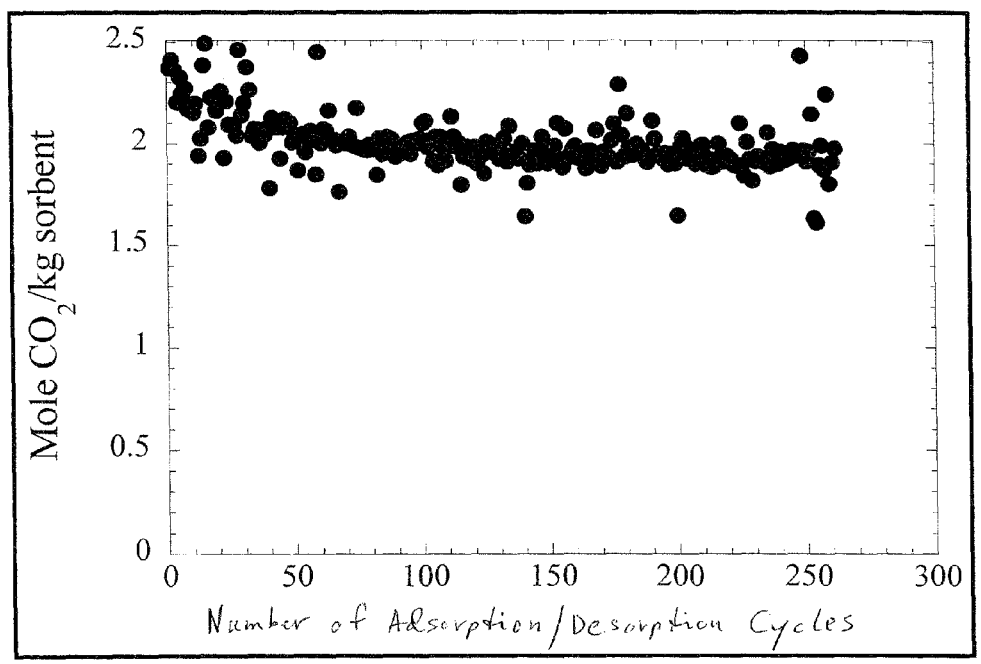
FIG. 4. $CO_2$ Loading Capacity of Sorbent 15C as a function of Number of Cycles, Adsorption/Desorption, Completed.

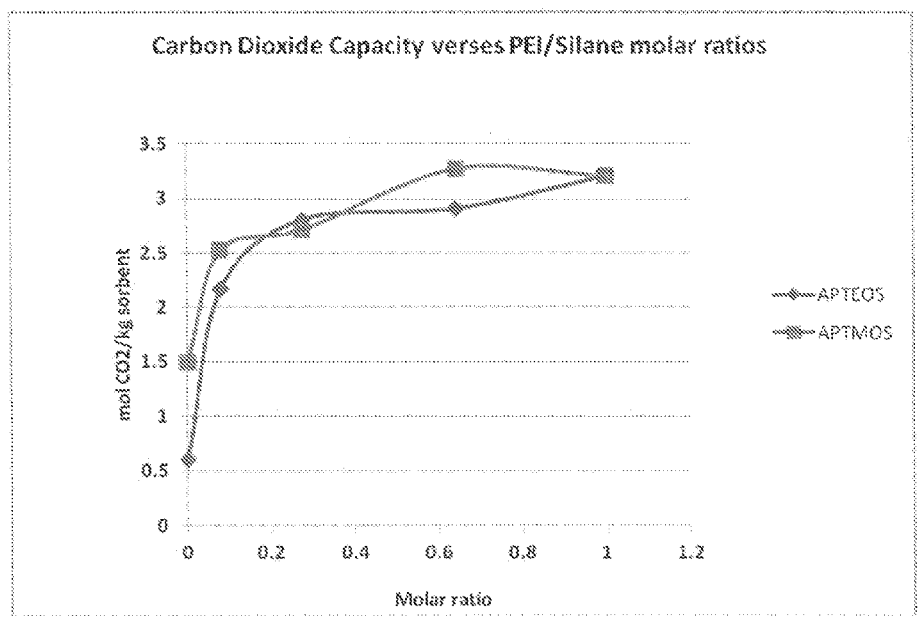
FIG. 5. Comparison of CO₂ loading capacity of APTEOS and APTMOS

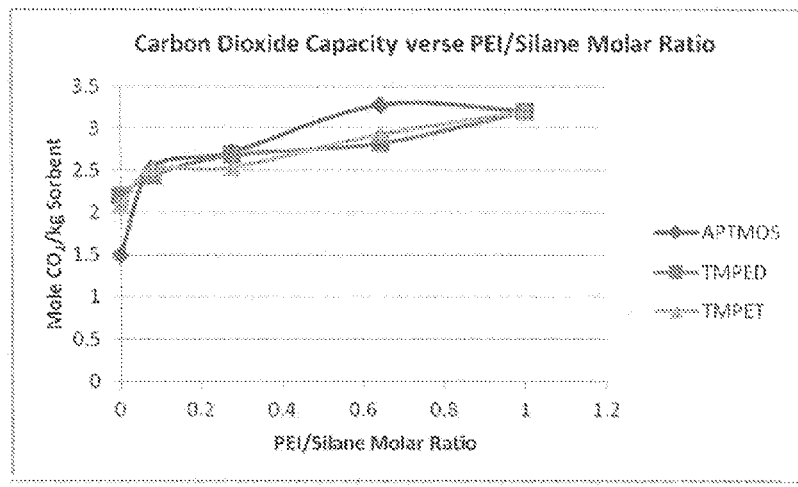
FIG. 6. Comparison of CO₂ loading of APTMOS, TMPED, and TMPET.

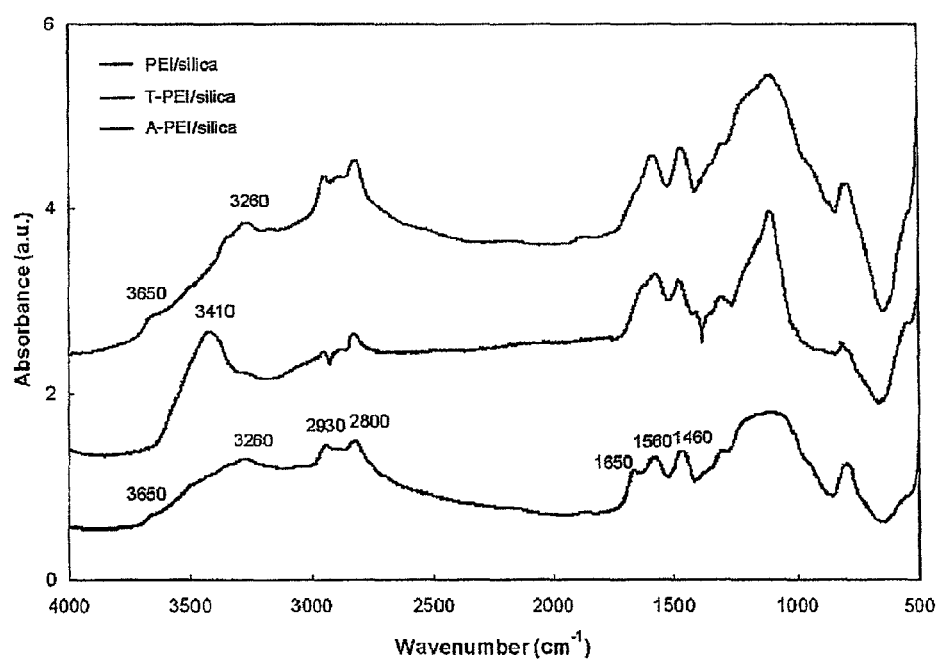
Figure 7. FT-IR spectra of PEI/silica (bottom), T-PEI/silica (middle), and A-PEI/silica (top) materials.

REGENERABLE IMMOBILIZED AMINOSILANE SORBENTS FOR CARBON DIOXIDE CAPTURE APPLICATIONS

PRIORITY

This Utility Application claims the benefits of a U.S. Provisional Patent Application filed on Aug. 18, 2010 as Ser. No. 61/374,747, the entirety of which is incorporated by reference.

CONTRACTUAL ORIGIN OF THE INVENTION

The United States Government has rights in this invention pursuant to the employer-employee relationship of the Government to the inventor as a U.S. Department of Energy employee at the National Energy Technology Laboratory.

BACKGROUND OF THE INVENTION

1. Field of the Invention

This invention relates to an improved method of separating carbon dioxide from fluids, and more specifically, this invention relates to an improved method of separating carbon dioxide from flue gases which utilizes immobilized amine sorbents having increased stability under high humidity and high temperature conditions such as those found in flue gases. The same method can also be used for the removal of carbon dioxide from ambient air.

2. Background of the Invention

Carbon dioxide capture is the separation of $CO_2$ from emissions sources or from the atmosphere with the subsequent recovery of a concentrated stream of $CO_2$ that is amenable to sequestration or conversion. Pulverized coal (PC) plants, which are 99 percent of all coal-fired power plants in the United States, burn coal in the presence of air to create steam. Carbon dioxide is exhausted as part of the flue gas at atmospheric pressure and a concentration of 10-15 volume percent of the flue gas. The post-combustion capture of $CO_2$ is a challenging application because (1) the low pressure and dilute concentration of the carbon dioxide dictate a high actual volume of gas to be treated; (2) trace impurities in the flue gas tend to reduce the effectiveness of the $CO_2$ absorbing processes; and (3) compressing captured $CO_2$ from atmospheric pressure to pipeline pressure (1,200-2,000 pounds per square inch (psi)) represents a large parasitic load.

Given the increased global warming due to the presence and production of greenhouse gases such as carbon dioxide ($CO_2$), the capture and permanent sequestration of carbon dioxide by economical means becomes an imperative mission. The "benchmark" process for post-combustion $CO_2$ capture at coal-fired plants is the commercially available monoethanolamine (2-aminoethanol) ($NH_2CH_2CH_2OH$) (MEA) wet scrubbing system. In this process, an aqueous MEA solution contacts the flue gas in an absorber to absorb the $CO_2$. The subsequent solution containing absorbed $CO_2$ is then heated in a regenerator to release $CO_2$. This system is an example of a temperature-swing absorption (TSA) process. Since the concentration of MEA is limited to 30% due to corrosion issues, large quantities of water must be handled and heated during operation. The limited $CO_2$ transfer capability of MEA results in high regeneration rates for adequate $CO_2$ loading and regeneration. All together, these characteristics make MEA-based $CO_2$ capture systems very energy intensive.

Direct capture of $CO_2$ from the air is an alternate technology to the capture of $CO_2$ from large point sources, and this has the advantage that it can address $CO_2$ emissions from all sources if the technology is operated on a sufficiently large scale. However, this presents the technical challenge to develop adsorbents that operate near ambient conditions and that can extract $CO_2$ from ultra-dilute sources with $CO_2$ concentrations ranging from 200 to 600 parts per million (ppm).

Large-scale deployment of carbon capture from point sources, coupled with carbon sequestration, can be accomplished through several different pathways which include cryogenic distillation, membrane purification, absorption with liquids, and adsorption using solids.

For the capture of $CO_2$ from both flue gases and ambient air, it is near critical that $CO_2$ sorbents must be designed to be reused extensively in a commercial $CO_2$ capture process, maintaining a high cyclic stability under realistic operating conditions.

Polyethyleneimine (PEI) has been used as a $CO_2$ sorbent while the PEI itself was adsorbed to inert silica substrates. This sorbent has displayed instability under steam-stripping conditions to remove adsorbed carbon dioxide. This instability may be due to the lack of covalent bonds between the aminopolymer and the inert silica support, and also due to the measurable water-solubility of low-molecular-weight PEI.

It is possible to synthesize thermally stable solid $CO_2$ sorbents with significantly reduced water solubility so the typical conditions of steam regeneration used to release the adsorbed $CO_2$ will not degrade the sorbents. The syntheses which are presently possible require coupling the amine sorbent with another moiety. These syntheses are multistep and expensive. The key to the commercialization of such a sorbent is the ability to manufacture the sorbent in bulk with minimal handling and simple equipment.

At present, there is not a method which can make amine sorbents wherein the amine is simultaneously (via one-step) coupled with another moiety and physically and chemically bonded to a substrate making the coupled amine sorbents very stable under high humidity multicycle use which includes heating to release $CO_2$.

A method is needed to stabilize solid amine sorbents under high humidity multicycle conditions which include heating. A need also exists for an improved method to produce physically and chemical stable amine sorbents for $CO_2$ so as to reduce costs due to spoilage of the amine sorbents. Yet another need exists for an amine sorbent which can adsorb $CO_2$ under a range of conditions from ambient atmospheres to point sources. Still another need exists for amine sorbents which demonstrate high $CO_2$ capacities under real $CO_2$ capture conditions. Yet another need exists for a one-step scalable synthesis of a coupled amine sorbent, suitable for economically viable production of commercial quantities.

SUMMARY OF THE INVENTION

It is an object of the present invention to provide a method for the absorption of carbon dioxide that overcomes many of the disadvantages of the prior art.

Another object of the present invention is to provide an improved method which uses a stable solid pre-formed polymeric amine sorbent to absorb carbon dioxide via adsorption. A feature of the invention is that the pre-formed polymeric amine sorbent is chemically and physically bonded to a substrate. Another feature is that the pre-formed polymeric amine is combined with a coupling agent which makes the polymeric amine water insoluble within the pores of the substrate. An advantage of these features is that the sorbent is very stable under steam regeneration conditions over hundreds of adsorption/regeneration cycles.

Still another object of the present invention is to provide a method which has a minimum spoilage of polymeric amine during cyclic steam regeneration conditions. A feature of this invention is that the polymeric amine is made water-insoluble by a coupling agent. An advantage of the invention is that the water-insolubility minimizes degradation of the amine, therefore resulting in a savings in energy costs and amine replacement costs.

Yet another object of the present invention is to provide a method which allows for the single-step synthesis of a coupled dual moiety amine sorbent for carbon dioxide adsorption. A feature of this invention is that a second moiety is coupled with an amine to make a more stable amine sorbent for $CO_2$ capture. An advantage of this feature is that the synthesis method is scalable so as to make commercial quantities. Another advantage of this feature is a considerable savings in fabrication costs of the coupled amine sorbent.

Still another object of the present invention is to provide amine sorbents with the sensitivity to adsorb $CO_2$ from ambient atmospheres. A feature of this invention is that the new amine sorbents can adsorb $CO_2$ at concentrations ranging from 200 to 600 ppm. An advantage of this feature is that $CO_2$ can be adsorbed from mobile sources such as automobiles thus improving air quality in urban areas. Yet another advantage is the removal of carbon dioxide from closed areas such as rooms in a dwelling and even the removal of carbon dioxide from natural gas so as to improve the natural gas's combustibility.

Yet another object of the present invention is to provide amine sorbents a high density of capture sites per gram of sorbent. A feature of this invention is that polymeric amines serve as the carbon dioxide-capturing moiety in the sorbent. An advantage of this feature is a high loading capacity which gives a much greater cost-effectiveness to use of these sorbents.

Briefly, the invention provides a method for the separation of carbon dioxide from fluid, the method comprising simultaneously coupling a phase-separating moiety with a second moiety and bonding them onto an inert substrate to create a mixture; and contacting the mixture with the fluid.

BRIEF DESCRIPTION OF THE DRAWINGS

The invention together with the above and other objects and advantages will be best understood from the following detailed description of the preferred embodiment of the invention shown in the accompanying drawings and photos, wherein:

FIG. 2 is a schematic diagram of aminosilane interactions with the inert silica substrate surface and of the aminosilane with itself, in accordance with features of the present invention;

FIG. 3 is a plot of the performance capacities of the sorbents at various PEI/3-Aminopropyltriethoxysilane (APTEOS) molar ratios as mol of $CO_2$/Kg sorbent versus PEI/APTEOS Molar Ratio, in accordance with features of the present invention;

FIG. 4 is a plot of mol $CO_2$/Kg absorbed by sorbent 15C versus number of adsorption/desorption cycles, in accordance with features of the present invention;

FIG. 5 is a plot of mol $CO_2$/Kg sorbent versus molar ratio of PEI (Mn=600)/silane for APTEOS and APTMOS (3-Aminopropyltrimethoxysilane), in accordance with features of the present invention;

FIG. 6 is a plot of mol $CO_2$/Kg sorbent versus molar ratio of PEI (Mn=600)/silane for APTMOS, (N-[3-(trimethoxysilyl)propyl]ethylenediamine (TMPED), and (N-[3-(trimethoxysilyl)propyl]ethlenetriamine (TMPET), in accordance with features of the present invention; and FIG. 7 is a schematic diagram of the FT-IR spectra of PEI/silica, T-PEI/silica, and A-PEI silica, in accordance with features of the present invention.

DETAILED DESCRIPTION OF INVENTION

Figure 1:
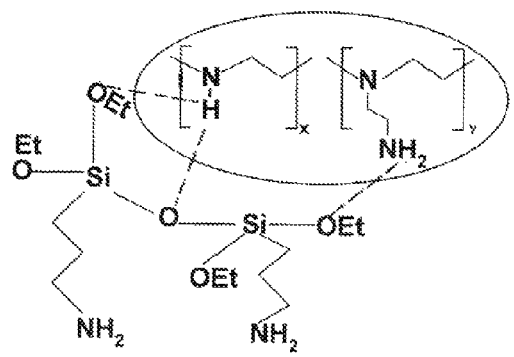
FIG. 1 is a schematic diagram of the interactions between an aminosilane and polyethyleneimine (PEI), in accordance with features of the present invention.

Analyses conducted at the National Energy Technology Laboratory (NETL) in Pittsburgh, Pa. and Morgantown, W. Va. shows that $CO_2$ capture and compression using amines raises the cost of electricity from a newly-built supercritical PC power plant by 84 percent, from 4.9 cents/kWh to 9.0 cents/kWh. The goal for advanced $CO_2$ capture systems is that $CO_2$ capture and compression processes added to a newly constructed power plant increase the cost of electricity by no more than 20 percent compared to a no-capture case. Another goal is to have an absorbing moiety which does not undergo degradation.

The regeneration of MEA scrubber solution has an enthalpy value for 20 and 30 mass percent solutions of +5308 kilojoules (kJ) and +4503 kJ per kilogram (kg) of solution, respectively. This regeneration energy can be greatly reduced by using amines adsorbed to solids. The invented combination provides the reactivity of aqueous amines, but at relatively lower heat capacities. The invention is valuable in pulverized coal (pc) combustion flue gas cleanup, particularly after any sulfur oxide ($SO_x$), nitrogen oxide ($NO_x$), mercury (Hg), arsenic (As), selenium (Se), and particulate removal.

The invention is also valuable for the removal of carbon dioxide from ambient air including in confined and enclosed areas and from substances such as natural gas.

The inventors have devised an improved method of making thermally stable and water-insoluble solid amine-based substrates by which carbon dioxide can be captured. The method causes a one-step coupling and immobilization of a phase-separating moiety and an organoalkoxysilane moiety onto inert silica substrates.

The phase-separating moiety and the stabilizing organoalkoxysilane moiety are coupled or cross-linked, covalently and/or noncovalently. FIG. 1 provides a schematic diagram of this interaction. The organoalkoxysilane moiety bonds the phase-separating moiety to the silica substrate to create a composite and it is this composite which is contacted with a carbon dioxide-containing fluid such as flue gas.

The polyethyleneamine has a molecular number (Mn) ranging between 423 and 2500.

This feature enables the ready regeneration of the sorbent with minimal degeneration of the phase-separating moiety.

The fluid includes, but is not limited to, point sources and ambient atmospheres.

The phase-separating moiety regenerates by steam regeneration (steam-stripping) which removes the $CO_2$ from the phase-separating moiety. Heat energy for the regeneration of the coupled sorbent can be taken from low-grade steam from the power plant itself. Steam-stripping provides both a (1) thermal driving force for desorption of carbon dioxide; and (2) a partial pressure driving force, as in the case of inert gas temperature swing.

Further, the inventors have found that the new sorbents are feasible for applications in both temperature swing adsorption (TSA) and pressure swing adsorption (PSA) processes for post-combustion $CO_2$ capture.

The phase-separating moiety is an amine, and comes from the group consisting of, but not limited to, linear primary amines, linear secondary amines, linear tertiary amines, branched primary amines, branched secondary amines, branched tertiary amines and any combination thereof.

A preferred embodiment of this instant invention employs polyethyleneimine (PEI) with a molecular number (Mn) from of about 423 to about 2500 as the phase-separating moiety coupled with aminopropyltriethoxysilane (APTEOS).

The second moiety comes from the group consisting of, but not limited to, organoalkyoxysilanes, titanium (IV) propoxide (tetrapropyl orthotitanate, $C_{12}H_{28}O_4Ti$), zirconium (IV) propoxide, and hafnium (IV) propoxide.

Organoalkoyoxysilanes include, but are not limited to, 3-aminopropyltriethoxy-silane (APTEOS), and 3-aminopropyltrimethoxysilane (APTMOS).

The second moiety provides a means for the phase-separating moiety to be water-insoluble in the pores of the inert substrate.

The inventors have found that the creation of water insolubility of the phase-separating moiety greatly increases the efficacy of the invention. Branched PEI is highly water soluble and would be readily washed out of the substrate pores under conditions of high humidity, quickly reducing the effectiveness of the sorbent. Immobilizing the PEI in the pores of the silica substrate stabilizes the sorbent against the high humidity of flue gas and required steam regeneration in flue gases.

In addition, the inventors have found that the new sorbents display a high affinity for $CO_2$ at high temperatures.

A salient feature of the invention is the use of cross-linked moieties which are chemically and physically bonded to an inert substrate. This feature makes the phase-separating moiety insoluble in the pores of the inert silica substrate.

Another salient feature of the invention is the use of a regenerable phase-separating moiety on an inert substrate which contains an amine $CO_2$ adsorbing moiety. FIG. 2 provides a schematic diagram of the interaction between the solid substrate and the reactive moieties.

The sorbent is contacted with a $CO_2$-bearing stream, such as flue gas from pulverized coal combustion.

The phase-separating moiety is a chemically bonded and physically adsorbed solid.

The partial pressure of the $CO_2$ in the ambient air or fluid flow can range from about 0 atmosphere (atm) to 1 atm. The total pressure for operation can range from about 1 atm (ambient pressure) to 40 atm. Preferably, the total operation pressure remains below the supercritical pressure of $CO_2$, which is 72.8 atm so as to keep the carbon dioxide in a gaseous state.

The temperature range for operation is from about ambient temperature to about 100° C.

For flue gases, after the flue gas has gone through flue gas desulfurization (FGD), the flue gas's pressure is typically slightly above ambient pressure and the temperature around 60° C. to 70° C. The following experimental results are meant to serve only as an example, and not to limit the scope of the instant invention in any manner or way.

Syntheses Detail of Amine-Immobilized Sorbents.

The general synthetic method for amine-immobilized sorbents was as follows:

1. Materials.

Methanol (reagent grade), Polyethyleneimine (PEI) (Molecular Number (Mn) 600), and 3-Amino propyltriethoxysilane (APTEOS) (98%) were used in the preparation of the immobilized sorbents. These materials were purchased from Aldrich Chemical Company (Milwaukee, Wis.) and used without further purification. The substrate was CS 2129 from The PQ Corporation (Malvern, Pa.). The physical properties of CS 2129 are given in Table 1 infra.

TABLE 1

| Substrate Physical Properties. | | | | | |
|---|---|---|---|---|---|
| Substrate | Chemical Backbone | Surface Area m$^2$/g | Pore Volume mL/g | Average Pore Diameter (nm) | Particle size microns |
| CS-2129 | Silicon Dioxide | 285 | 2.4 | 33.8 | 100 |

For the preparation of the adsorbents, the silica substrates were first dried under vacuum at 100° C. for 24 hours (h) to remove absorbed water on the surface of the silica substrates before use.

2. Preparation of the Immobilized Sorbent.

A typical method of preparation is as follows. Two hundred milliliters (mL) of methanol ($CH_3OH$), 50 grams (g) of silica substrate, 25 g of PEI and 25 g of APTEOS are contacted with each other into a slurry in a one liter (L) roto-vap flask, and agitated for 5 minutes (min). The slurry mixture, still in the roto-vap flask, is subsequently placed in a roto-bath at 80° C. and placed under a vacuum of 10 mm Hg (Torr) for a period of one hour (hr). The final product, immobilized aminosilane sorbent, was removed from the flask and stored in a refrigerator until use.

FIGS. 1 and 2 show the kinds of bonds and physical attractions believed to exist between PEI and silica substrate and between PEI, aminosilane, and silica substrate.

The compositions of sorbents described in this work are summarized in Table 2 infra.

TABLE 2

| Composition of the PEI/APTEOS sorbents at 50% loading. | | | |
|---|---|---|---|
| Sorbent ID | CS-2129 mass, g | Mass of PEI Mn 600, g | Mass of APTEOS, g |
| 15A | 10.0 | 0 | 10.0 |
| 15B | 10.0 | 3.0 | 7.0 |
| 15C | 10.0 | 5.0 | 5.0 |
| 15D | 10.0 | 7.0 | 7.0 |
| 15E | 10.0 | 10.0 | 10.0 |

Sorbents 15A through 15E were analyzed using two different TGA's (thermogravimetric analyzer) (Thermo Cahn Thermax 300, Thermo Fisher Scientific, Inc., Waltham, Mass.; and a Perkin-Elmer Pyris 1, PerkinElmer, Waltham, Mass.) under dry conditions. The gas stream was 100% $CO_2$ with an absorption temperature of 40° C. and desorption temperature of 105° C. Results are shown in Table 3 infra and in FIG. 3.

TABLE 3

| TGA analysis of PEI/APTEOS sorbents. | | | |
|---|---|---|---|
| Sorbent ID | Moles $CO_2$/Moles PEI Amine | Moles $CO_2$/Moles Total Amine | Moles $CO_2$/Kg Sorbent |
| 15A | — | 0.27 | 1.01 |
| 15B | 0.62 | 0.43 | 2.16 |
| 15C | 0.48 | 0.40 | 2.80 |
| 15D | 0.36 | 0.33 | 2.90 |
| 15E | 0.28 | 0.28 | 3.20 |

As the total amine content of the sorbent increases, the $CO_2$ sorption also increases, in a non-linear fashion, to 3.20 mol $CO_2$/Kg sorbent. From Table 3 and FIG. 3, the most efficient use of the amine functional groups would be in sorbents 15B to 15D, but sorbent stability must be also be taken into consideration.

As shown in FIG. 3, as the molar ratio of the PEI/APTEOS increased from 15A through 15E, the $CO_2$ capacities increased up to a value of 3.20 mol $CO_2$/kg sorbent. When the PEI is immobilized by physical absorption into the substrate pores, it should result in the most stable sorbent under the condition of high humidity.

$CO_2$ Capture Fixed-Bed Reactor Detail

A detailed description of the $CO_2$ Capture Fixed-Bed Reactor utilized to determine $CO_2$ capacities and subsequent deactivation, depicted in Table 4, infra, of the organoalkoyoxysilane (aminosilane) sorbents is found in U.S. Pat. No. 7,288,136, awarded to Gray, et al. on Oct. 30, 2007, the entirety of which is incorporated by reference. For this work, the reactor was combined with an Ominostar Mass Spectrometer (MS) manufactured by Pfeiffer Vacuum (Asslar, Germany).

To investigate sorbent stability, sorbents 15A, 15C, and 15E were tested in the $CO_2$ Capture Fixed-Bed Reactor described supra by Temperature Swing Adsorption (TSA) under dry conditions for two cycles, then under two different conditions of relative humidity (8% relative humidity for $CO_2$ sorption and 90% relative humidity for four cycles followed by an additional two dry cycles.

The adsorption temperature was 60° C. for two dry atmosphere cycles with the desorption temperature 105° C., followed by four cycles at 60° C. and 8% relative humidity for adsorption; and, 105° C. and 90% relative humidity for desorption, followed by the two additional dry cycles.

The 90% relative humidity was used to simulate steam regeneration conditions to test the sorbents' resistance to deactivation by water. The $CO_2$ capacity loss for three different sorbents after eight cycles is given infra.

TABLE 4

Cyclic Test of Sorbents/$CO_2$ Capacities and Deactivation[1].

| Sorbent | PQ 2129 | PEI Mn 600 grams (g) | Silane grams (g) | Mol $CO_2$/Kg sorbent (1st Cycle) | After 8th Cycle | Capacity % Loss[2] |
|---|---|---|---|---|---|---|
| 15E | 10.0 | 10.0 | 0.0 | 3.091 | 1.888 | 38.9 |
| 15C[2] | 10.0 | 5.0 | 5.0 | 2.697 | 2.270 | 15.6 |
| 14C[3] | 10.0 | 10.0 | 5.0 | 2.542 | 2.064 | 18.8 |
| 15A[4] | 10.0 | 0.0 | 10.0 | 1.233 | 1.133 | 7.9 |

All analyses were performed utilizing FTIR, X-ray Photoelectron Spectroscopy (XPS-conditions of XPS analysis similar to those given in U.S. Pat. No. 7,288,236, awarded to Gray, et al. on Oct. 30, 2007.), and Solid State NMR.

1. Base for determination of % loss is the mol $CO_2$/Kg sorbent at the end of the 1st cycle.
2. 3-Aminopropyl triethyloxysilane (PEI/APTEOS=0.277) 59.9% improvement over 15E (PEI).
3. 3-Aminopropyl trimethoxysilane (PEI/APTMOS=0.231) 51.7% improvement over 15E (PEI).
4. 3-Aminopropyl triethyloxysilane (PEI/APTEOS=0.0) 79.7% improvement over 15E (PEI).

Exemplary sorbent 15A displayed the highest cyclic stability of the three as it is composed only of APTEOS, which is believed to be covalently bound to the surface of the inert silica substrate and therefore resistant to being washed out by the high humidity present in the flue gases. Sorbent 15A showed the lowest $CO_2$ capacity loss of 7.9% over eight cycles of absorption/desorption.

Sorbent 15E displayed the highest $CO_2$ capacity and the highest $CO_2$ capacity loss over eight cycles. The high capacity loss is attributed to the high water of the solubility of the PEI.

Sorbent 15C displays the best combination of capacity and stability with a moderate $CO_2$ capacity loss of 15.8% and an average overall $CO_2$ capacity, over eight cycles, of 2.48 mole $CO_2$/Kg sorbent. APTEOS seems to be an exemplary additive to PEI to give a stable sorbent.

All of these sorbents were prepared by a scalable, single-stage process that combined the PEI and APTEOS on a high surface area, porous silica substrate which allowed the production of more than 500 Kg of the immobilized amine sorbent (IAS).

To determine if sorbent 15C has sufficient long-term stability, 15C was tested in a fixed-bed reactor for a far greater number of cycles. FIG. 4 displays the results. FIG. 4 is a plot of mol $CO_2$/Kg sorbent for sorbent 15C over more than 300 adsorption/desorption cycles under conditions of 90% relative humidity. There is an initial decrease in the $CO_2$ capacity of sorbent 15C, but the sorbent's capacity stabilizes after about 50 cycles.

FIG. 5 is a plot of mol $CO_2$/Kg sorbent versus molar ratio of PEI (Mn=600)/silane for APTEOS and APTMOS. APTMOS does show a higher loading capacity over a molar ration range of 0.0 to 1.0 suggesting APTMOS could be used if a higher loading capacity were needed. The graphical data is based on TGA with weight change measurements (adsorption/desorption) conducted at 60° C. under dry (pure) $CO_2$ and 105° C. under dry $N_2$.

The inventors have examined other aminosilanes. FIG. 6 is a plot of mol $CO_2$/Kg sorbent versus molar ratio of PEI (Mn=600)/silane for APTMOS, (N-[3-(trimethoxysilyl)-propyl]ethylenediamine (TMPED), and (N-[3-(trimethoxysilyl) propyl]ethlenetriamine (TMPET). TMPED and TMPET show a greater loading capacity when the PEI content is low, mostly TMPED or TMPET bound to the silica substrate. The graphical data is based on TGA with weight change measurements (adsorption/desorption) conducted at 60° C. under dry (pure) $CO_2$ and 105° C. under dry $N_2$.

Initially, CARiACT G10 HPV (Fuji Silysia Chemical Limited Company, Japan) was used to make amine-immobilized sorbents which had similar carbon dioxide absorbing and desorbing characteristics as described for those sorbents supra. CARiACT G10 HPV has a surface area of 300 square meters per g ($m^2$/g); a pore volume of 1.30 milliliters per gram (mL/g); and, an average pore diameter of 17 nanometers (nm).

By similar synthetic methods as already described, three sorbents were fabricated: PEI/silica, A-PEI/silica, and T-PEI/silica. A represents APTEOS and T represents tetrapropyl orthotitanate. Thus, these three sorbents are similar to some of those described ante, only with a different silica substrate.

Structural Change Detail.

FIG. 7 displays FT-IR spectra of PEI/silica (bottom), T-PEI/silica (middle), and A-PEI/silica. The FT-IR spectra of silica-based materials can be classified into two separate regions that correspond to the surface and the framework, respectively.

The absorption bands in the higher energy regions can be attributed to the O—H stretches of the surface silanols. In the PEI/silica adsorbent, the silanol peaks were broadened and shifted to a lower frequency compared to the sharp peak associated with isolated silanols observed in pure silica (>3700 $cm^{-1}$). This may be due to hydrogen bonding effects of water or polymer physisorbed in the PEI/silica material. Other absorption bands attributable to the silica framework are observed at about 1100 cm$^{-1}$ and 800 cm$^{-1}$, corresponding to be asymmetric and symmetric stretching vibrations of Si—O—Si bonds, respectively.

The spectrum of the A-PEI/silica sample does not show major differences when compared to that of a PEI/silica sample, suggesting similar chemical structure of the polymers in both hybrid materials. However, the absorption bands of a T-PEI/silica sample show considerable changes, especially for the vibrational absorptions for amine groups. The N—H stretching absorption bands of primary amines (3260 cm$^{-1}$) decreased in this adsorbent, while the characteristic absorption bands for the N—H bending vibration of primary amines (1650 cm$^{-1}$) disappear. However, a new strong band appears at 3410 cm$^{-1}$. This new band can be attributed to the N—H stretching absorption of secondary amines. Disappearance of the bending vibration of N—H bonds indicates that primary amines in a T-PEI/silica sample are changed or converted, possibly because of the cross-linking of polymer chains. The hydrogen bonds that form allow the primary amine to emulate a secondary amine. Thus, those hydrogen atoms so occupied would be certainly less able to interact with water molecules. These changes of the absorption bands show that the hydrophilicity of PEI in a T-P El/silica sample may be weaker than that of a PEI/silica sample.

The synthesis method described is one-step as opposed to more complex chemical procedures required to make this type of sorbent. Desired amounts of PEI and methanol are combined with silica to produce a slurry. A stabilizing agent such as tetrapropyl orthotitanate or (3-aminopropyl) triethoxysilane (APTES) is added during the formation of the slurry. Specifically, the stabilizing agent is dissolved in methanol with PEI and then mixed with porous silica to make the slurry. Incorporation of the polymeric amines is facilitated by removing the solvent.

The invention uses cross-linked moieties which are chemically and physically bonded to an inert substrate. This makes the phase-separating moiety insoluble in the pores of the inert silica substrate.

The invention uses a regenerable phase-separating moiety on an inert substrate which contains an amine $CO_2$ adsorbing moiety.

The phase-separating moiety is a chemically bonded and physically adsorbed solid. The cross-linked/coupled aminosilane polyethyleneimine sorbents very stable under the steam regeneration conditions required for these carbon dioxide capture processes.

The new sorbents are feasible for applications in both temperature swing adsorption (TSA) and pressure swing adsorption (PSA) processes for post-combustion $CO_2$ capture.

The sorbents are stable over hundreds of adsorption/desorption cycles.

The sorbents can be used for carbon dioxide capture from both point sources such as industrial flue gases and ambient atmospheres.

The new sorbents display a high affinity for $CO_2$ at high temperatures.

The invention is valuable in pulverized coal (pc) combustion flue gas cleanup, particularly after any sulfur oxide ($SO_x$), nitrogen oxide ($NO_x$), mercury (Hg), arsenic (As), selenium (Se), and particulate removal.

The invention is also valuable for the removal of carbon dioxide from ambient air including in confined and enclosed areas and from substances such as natural gas.

The synthesis method is readily scalable for commercial and industrial use.

The temperature range for operation is from ambient to 100° C.

The $CO_2$ partial pressure can vary from 0 atm to 1.0 atm.

The total pressure can vary from of about 1 atm to 40 atm.

It is to be understood that the above description is intended to be illustrative, and not restrictive. For example, the above-described embodiments (and/or aspects thereof) may be used in combination with each other. In addition many modifications may be made to adapt a particular situation or material to the teachings of the invention without departing from its scope. Specifically, the inventors envision that the biofuel generated via the invented method and system can be used in neat form, a blend of different carbon length fuel, or as a "drop-in" form, in other words mixed with fuel generated from other sources (e.g. fossil fuel sources or other non-biofuel/nonrenewable fuel sources), to provide a suitable combustible mixture.

While the dimensions, species, types of other materials and media described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

The embodiment of the invention in which an exclusive property or privilege is claimed is defined as follows:

1. A method for the separation of carbon dioxide from fluid, the method comprising:
   (a) simultaneously coupling a phase-separating polymeric amine moiety with a stabilizing moiety and bonding them onto an inert substrate in a single step to create a mixture; and
   (b) contacting the mixture with the fluid to remove carbon dioxide.

2. The method as recited in claim 1 wherein the phase-separating moiety polymeric amine is selected from the group consisting of linear primary amines, linear secondary amines, linear tertiary amines, branched primary amines, branched secondary amines, branched tertiary amines and any combination thereof.

3. The method as recited in claim 1 wherein the stabilizing moiety is a compound selected from the group consisting of organoalkoyoxysilanes, titanium (IV) propoxide, zirconium (IV) propoxide, and hafnium (IV) propoxide.

4. The method as recited in claim 1 wherein the stabilizing moiety causes the phase-separating moiety to be water-insoluble in the pores of the inert substrate.

5. The method as recited in claim 1 wherein the bonding is both chemical and physical.

6. The method as recited in claim 1 wherein the fluid is derived from point sources or ambient atmospheres.

7. The method as recited in claim 1 wherein the fluid contains a partial pressure of $CO_2$ from about 0 atmosphere (atm) to 1 atm.

8. The method as recited in claim 1 wherein the $CO_2$ reacts with the phase-separating moiety.

9. The method as recited in claim 1 wherein the coupled phase-separating moiety is regenerated by pressure swinging.

10. The method as recited in claim 1 wherein the temperature range for operation is from about ambient temperature to about 100° C.

11. The method as recited in claim 1 wherein the range of the total pressure for operation is from of about 1 atm to 40 atm.

* * * * *

UNITED STATES PATENT AND TRADEMARK OFFICE
CERTIFICATE OF CORRECTION

PATENT NO. : 8,834,822 B1  
APPLICATION NO. : 13/212284  
DATED : September 16, 2014  
INVENTOR(S) : Gray et al.

Page 1 of 1

It is certified that error appears in the above-identified patent and that said Letters Patent is hereby corrected as shown below:

Title Page, Item (12) delete "Gay" and insert --Gray--

Title Page, Item (75)

Delete

"(75) Inventors: McMahan Gay, Pittsburgh, PA (US);"

And insert

--(75) Inventors: McMahan Gray, Pittsburgh, PA (US);--

Signed and Sealed this  
Twelfth Day of May, 2015

Michelle K. Lee  
*Director of the United States Patent and Trademark Office*